(12) United States Patent
Rehman et al.

(10) Patent No.: US 8,040,900 B2
(45) Date of Patent: Oct. 18, 2011

(54) N-PORT NETWORK ADAPTOR

(75) Inventors: Sadiq Rehman, Karnataka (IN); Anil Kumar Singh, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/173,939

(22) Filed: Jul. 16, 2008

(65) Prior Publication Data
US 2010/0014525 A1 Jan. 21, 2010

(51) Int. Cl.
*H04L 12/28* (2006.01)
*H04L 12/56* (2006.01)
*G06F 3/00* (2006.01)

(52) U.S. Cl. .................. 370/395.7; 370/420; 710/14

(58) Field of Classification Search ............... 710/14
See application file for complete search history.

(56) References Cited

U.S. PATENT DOCUMENTS

| | | | |
|---|---|---|---|
| 5,659,684 A * | 8/1997 | Giovannoni et al. | 709/250 |
| 5,671,355 A | 9/1997 | Collins | |
| 5,943,481 A | 8/1999 | Wakeland | |
| 6,216,170 B1 * | 4/2001 | Giovannoni et al. | 709/250 |
| 2003/0229809 A1 * | 12/2003 | Wexler et al. | 713/201 |
| 2004/0068592 A1 | 4/2004 | Higashitani et al. | |
| 2004/0090970 A1 * | 5/2004 | Sanchez et al. | 370/397 |
| 2004/0098518 A1 * | 5/2004 | Beckett et al. | 710/14 |
| 2006/0129702 A1 | 6/2006 | Koertel | |
| 2008/0294915 A1 * | 11/2008 | Juillerat et al. | 713/300 |
| 2009/0113542 A1 * | 4/2009 | Price | 726/15 |

* cited by examiner

*Primary Examiner* — Chirag Shah
*Assistant Examiner* — Suk Jin Kang
(74) *Attorney, Agent, or Firm* — Yee & Associates, P.C.; David A. Mims, Jr.

(57) ABSTRACT

Methods, systems and computer program products for an N-port network adaptor that is interchangeable between a network switch and a network adaptor. Embodiments of the invention include a method in a network device having a random access memory, a nonvolatile random access memory and a flash memory, the method including operating in a network switch/router mode of operation, operating in a network adapter mode of operation and switching in between the network switch/router operation and the network adapter operation in response to receiving a device configuration signal.

8 Claims, 3 Drawing Sheets

N-PORT NETWORK ADAPTOR

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to network (e.g., Ethernet) adaptors, and particularly to methods, systems and computer program products for an N-port network adaptor that is interchangeable between a network switch and a network adaptor.

2. Description of Background

A network adaptor (also, network card, LAN Adapter or NIC (network interface card)) is a piece of computer hardware designed to allow computers to communicate over a computer network. A network switch (router) is a computer-networking device that connects network segments. A network segment is a portion of a computer network where in every device communicates using the same physical layer. Devices that extend the physical layer, such as repeaters or network hubs, are also considered to extend the segment. However, devices that operate at the data link layer level or higher create new physical layers and thus create rather than extend segments.

Currently, there exist many N-port network adapters (especially 4-port adapter) that provide four interfaces to a computer to which the network adaptor is connected. However, in order to configure a local network, the user also needs a network switch. Currently, there are no combination network adaptor/network switch. Therefore, it would be desirable to have a combination network adaptor/switch.

BRIEF SUMMARY

Embodiments of the invention include a method in a network device having a random access memory, a non-volatile random access memory and a flash memory, the method including operating in a network switch/router mode of operation, operating in a network adapter mode of operation and switching in between the network switch/router operation and the network adapter operation in response to receiving a device configuration signal.

Additional embodiments include a network apparatus, including a processor, a non-volatile random access memory, a plurality of ports configured to be switched between internal and external ports and a process residing on the processor for switching the apparatus between a network adapter mode and a network switch/router mode.

Further embodiments include a computer program product for providing mode of operation in a network device having a random access memory, a non-volatile random access memory and a flash memory, the computer program product including a tangible storage medium readable by a processing circuit and storing instructions for execution by the processing circuit for performing a method including operating in a network switch/router mode of operation, operating in a network adapter mode of operation and switching in between the network switch/router operation and the network adapter operation in response to receiving a device configuration signal.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically we have achieved a solution which provides an interchangeable network adaptor/switch in a single device. As such, users have a combined switch/router and adapter device that can be easily switch between two modes of operation via software or hardware.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments include an N-port adapter (N>1) as a switch/router. In exemplary embodiments, the interchangeable N-port adapter/router can be configured as a normal adapter or as a switch/router device. In exemplary embodiments, the two modes (i.e., switch/router and adaptor) can be toggled via software attributes assigned to the NIC (Network Interface card). In exemplary embodiments, the N-port adaptor/router can be reset to a default mode, which is an adapter mode via a RESET button.

Figure 1:
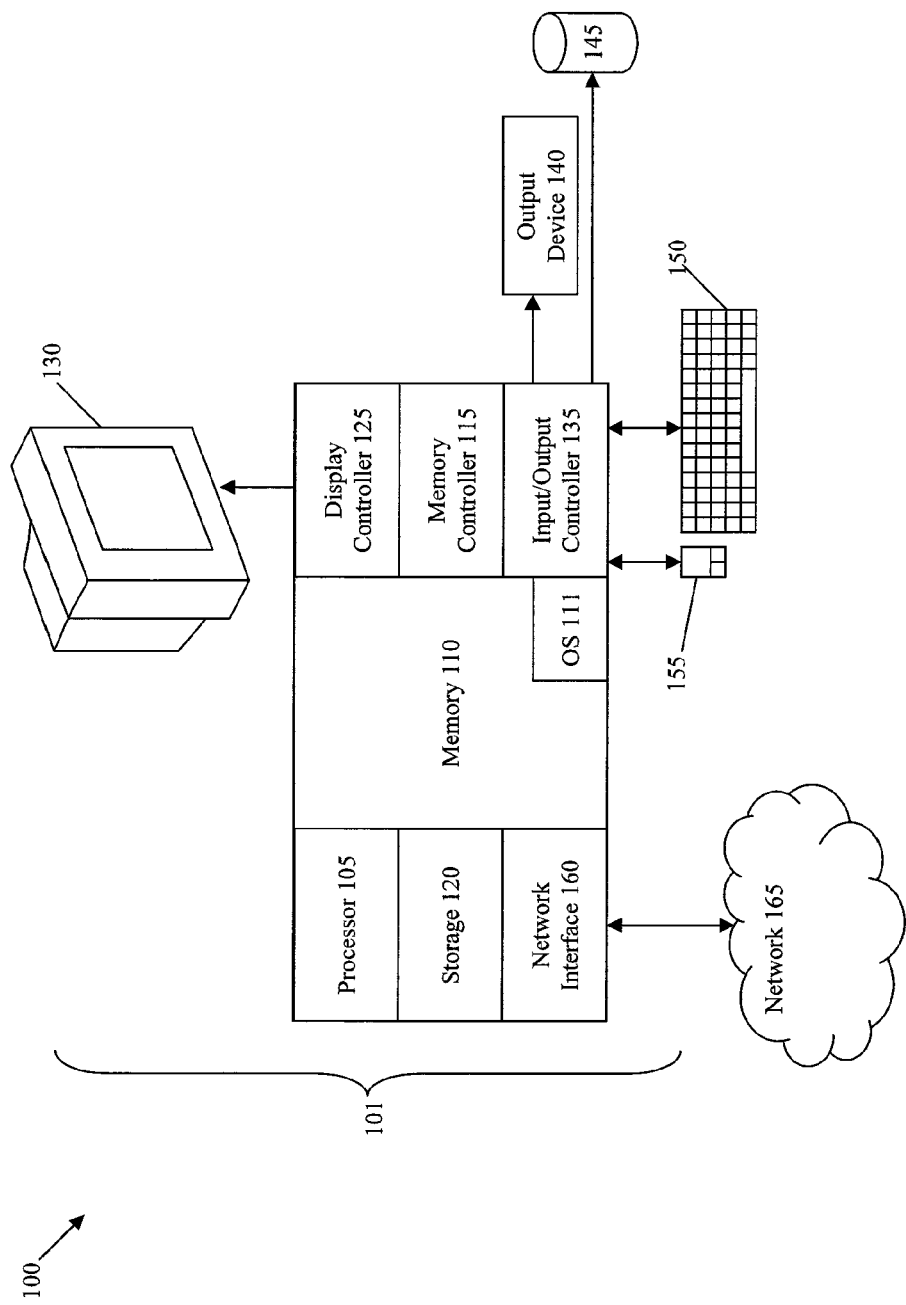
FIG. 1 illustrates an exemplary embodiment of a system for supporting the interchangeable network adaptor/switch in accordance with exemplary embodiments.

FIG. 1 illustrates an exemplary embodiment of a system 100 for supporting the interchangeable network adaptor/switch in accordance with exemplary embodiments. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the combined network adaptor/switch methods described herein in accordance with exemplary embodiments and a suitable operating system (OS) 111. These instructions are device drivers and in this embodiment referred to as entX (X=0, 1, 2 . . . ). But the notation is not limited to entX notation only; they can be any other industry-followed notation too. The operating system 111 essentially controls the execution of other computer programs, such the combined network adaptor/switch systems and methods described herein, and provides scheduling, input-output control, file and data management, memory management, and communication control and related services.

The combined network adaptor/switch methods (referred to as entX in the present embodiment, where X=0, 1 . . . ) described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the combined network adaptor/switch methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. As further described herein, the network interface can be a combined network adaptor/switch, which is interchangeable between a network adaptor and a network switch/router, thereby providing the functionality for both a network adaptor and a network switch/router. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The combined network adaptor/switch methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The combined network adaptor/switch methods described herein can be embodied in any computer readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that program can be electronically captured, via for instance optical scanning of paper or other non-computer readable storage medium, then compiled, interpreted or otherwise processed in a suitable manner if necessary, and then stored in a computer memory.

In exemplary embodiments, where the combined network adaptor/switch methods are implemented in hardware, the combined network adaptor/switch methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, exemplary embodiments include the ability to implement an N-port adapter as a switch/router. In exemplary embodiments, N is greater than 1 because a network switch/router should have at least two ports. For illustrative purposes, a four-port network adaptor is discussed herein because four port adapters are currently common. However, it is understood that N can be any number in other exemplary embodiments. It is further understood that the terms "switch" and "router" can be used interchangeably, but for the discussion, the term "switch" is used herein. It is appreciated that the use of the term "switch" is not intended to limit the functionality of the systems and methods described herein, which provide the functionality of both routers and switches similar to most of currently available switches. For ease of discussion the exemplary interchangeable N-port adaptor/switch is referred to as a Network Interface Card (NIC).

Figure 2:
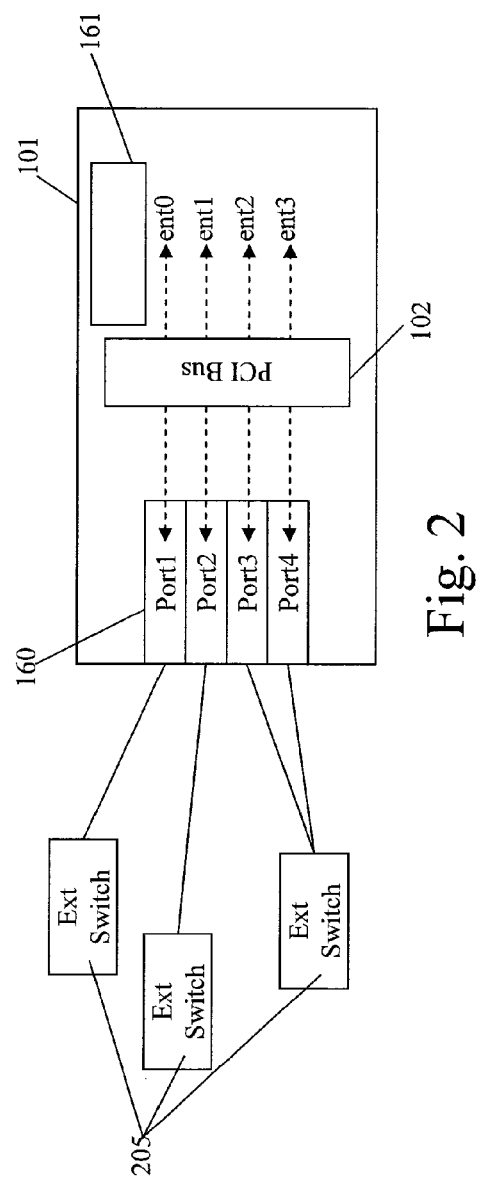
FIG. 2 illustrates a system diagram of a NIC card configured as an adaptor in accordance with exemplary embodiments.

In exemplary embodiments, the NIC described herein operates in two modes, which is software configurable: 1) an adapter mode, and 2) a switch mode. In exemplary embodiments, when the NIC is configured in the adapter mode, the NIC serves as an adapter hence providing four interfaces to the computer (e.g., the computer 101) to which the NIC is connected. FIG. 2 illustrates a system diagram of a NIC card 160 configured as an adaptor in accordance with exemplary embodiments. The NIC card 160 is connected to the computer 101. As known in the art, the NIC card 160 can be connected to the computer 101 via a PCI bus 102. In exemplary embodiments, the NIC card 160 includes four ports (i.e., port1, port2, port3, port4) each operatively coupled to a respective ent (i.e., ent0, ent1, ent2, ent3 respectively. As described above, ent is the device driver instance of network adapter in the computer 101. Device drivers run in the memory 110. This instance is visible externally to users so that they can see the state of network adapter. Whenever a network card/adapter is plugged into the computer 101, the card needs to be configured. Once configured, an entX entry is visible to the OS 111 which indicates that network card/adapter has been detected and can be used by the user. If entX is not visible to the user then adapter can't be used. Furthermore, each port on the NIC card can be coupled to one or more external switches 205 (the switch 205 is part of network 165). Therefore, it is appreciated that the NIC card 160 can be configured as a four port adapter card similar to four port adapter cards currently available. The NIC card 160 further includes interconnection fabric, flash and NVRAM, shown collectively as 161 and as described herein.

Figure 3:
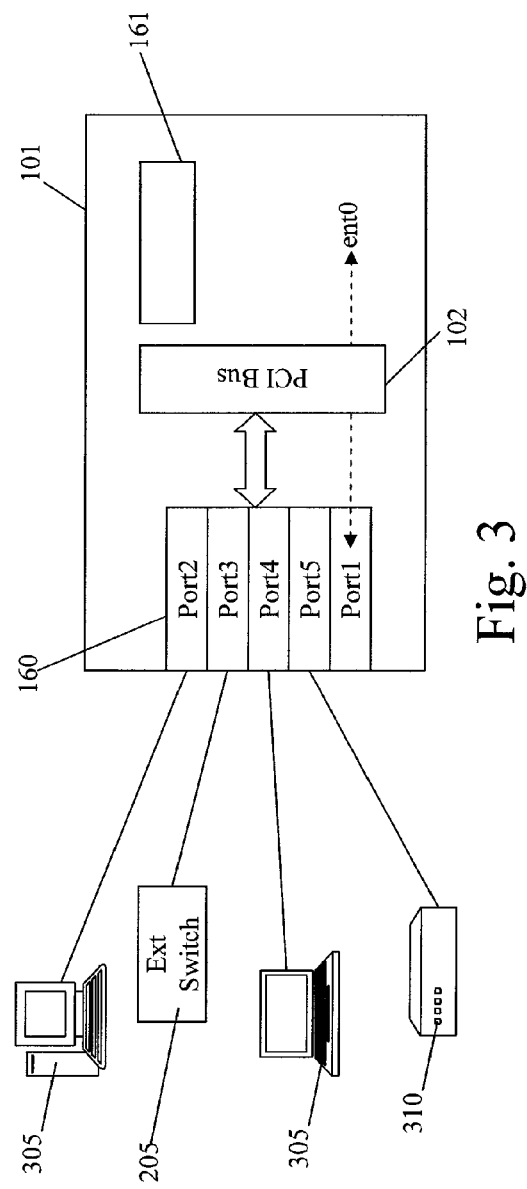
FIG. 3 illustrates a system diagram of a NIC card configured as a switch/router in accordance with exemplary embodiments.

FIG. 3 illustrates a system diagram of the NIC card 160 configured as a switch/router in accordance with exemplary embodiments. Similar to FIG. 2, the NIC card 160 is connected to the computer 101. As known in the art, the NIC card 160 can be connected to the computer 101 via a PCI bus 102. In exemplary embodiments, the NIC card 160 includes five ports (i.e., port1, port2, port3, port4, port5) in which the single port1 is operatively coupled to ent0. In exemplary embodiments, when the NIC card 160 is configured in the switch mode as illustrated, the NIC card 160 serves as a network adapter for the connected computer (e.g., the computer 101) as an independent switch, as well with four available ports (including one for uplink). As such, in the switch mode, the NIC card 160 provides five ports, four external ports (i.e., port2, port3, port4, port5) for outside network devices (i.e., workstations 305, external switch 205 and a modem 310, for example) and one internal port (i.e., port1) for the computer 101 to which the NIC card 160 is connected. In exemplary embodiments, the four external ports include the manufacturer provided media access control (MAC) address for each port. IN addition, the one internal port (i.e., port1) includes an automatically generated MAC address. As known in the art, the MAC address is a quasi-unique identifier attached to most network adapters (i.e., the NIC card 160). The MAC is a number that acts like a name for a particular network adapter, such as the NIC card 160. For example, the network cards in two different computers (e.g., a workstation 305 and the computer 101) have different names, or MAC addresses, as would an Ethernet adapter and a wireless adapter in the same computer, and as would multiple network cards in a router. The manufacturer of the N-port NIC can keep one MAC address aside from the MAC address pool provided to him by International OUI (Organizational unique identifier) authority. This MAC address is used as the internal port (ent0 of FIG. 3) whenever NIC is toggled to switch mode. When in Adapter mode this MAC address is not used at all. Alternatively, the switch can use automatic MAC address spoofing algorithms to generate a unique MAC address in the network, which is assigned to internal port (ent0 of FIG. 3). This algorithm uses the OUI provided to the manufacturer of the NIC to generate unique MAC address. As such, any available algorithm or methodology that applies for virtual adaptors can be implemented to generate a virtual address for the NIC card 160 in the switch mode. In exemplary embodiments, the NIC card 160 in the switch mode maintains records for all the MAC addresses for all devices on the NIC card 160 (i.e., the workstations 305, the external switch 205 and the modem 310) including that of internal network port for routing purposes. The NIC card 160 further includes interconnection fabric, flash and NVRAM, shown collectively as 161 and as described herein.

In exemplary embodiments, the exemplary NICs described herein include software attributes (e.g., a device configuration signal) for toggling between the adapter mode to the switch mode and vice-versa. Additionally, the NIC can be reset to a default mode, which can be the adapter mode in exemplary embodiments (by inserting a pin in RESET hole on the NIC card for example), thereby providing a hard reset for the NIC. It is appreciated that this kind of hard RESET capability is similar to the kinds of mechanisms as provided in most of the available routers/switches currently available. In exemplary embodiments, to move back to the switch mode, the software attribute is set again to the switch mode. In exemplary embodiments, the reset to the default (e.g., adapter mode) can also be performed in software. As such, a soft reset is also contemplated in exemplary embodiments.

In exemplary embodiments, the exemplary NICs described herein include hardware components for both an adapter and a switch/router. For example, the hardware components for the adapter include, but are not limited to: 1) a transceiver for putting packets on a network cable; 2) a buffer/RAM for storing excess data while communication between machine and physical media is occurring; 3) a parallel-to-serial communicator for data conversion from the computer to the cable and vice-versa; and 4) a processing unit (CPU) for processing. The hardware components for the network switch include but are not limited to: 1) interconnection Fabric between each port for fast and simultaneous data transfer; 2) ROM that contains bootstrap code (Bootstrap code is executed by NIC when its started in Switch mode during soft or hard RESET, which occurs for every switch whenever its first powered on); 3) flash memory that contains an operating system image, retained during reboots; 4) RAM that contains a routing table/running-configuration; 5) NVRAM that contains configuration files for information related to each port and anything else vital to the switch and 6) a processing unit (CPU) for processing. In addition, the NIC includes additional hardware components including, but not limited to: 1) ROM for a switch bootstrap program; 2) NVRAM for storing configuration files; 3) flash memory for storing an operating system image; and 4) interconnection Fabric to provide connection between ports.

In exemplary embodiments, the NIC further includes a toggling register or toggling storage in NVRAM, which provides an indication in the NIC that the NIC has been toggled between the adapter and switch/router modes. Either a separate toggling register or a reserved space in NVRAM can be used to store the current mode of NIC, which does not change over reboots and power off As described above, the default for the NIC can be the adapter mode. As further described above, software attributes such as a device configuration signal can switch the modes of operation of the NIC. In other exemplary embodiments, an external hardware switch can be implemented to switch the mode of operation of the NIC.

The following table summarizes the hardware components for the NIC as described above:

| Hardware Components | Available in Adapter mode | Available in Switch mode | Remarks |
|---|---|---|---|
| RAM | Yes | Yes | |
| ROM | No | Yes | No Bootstrap required in case of Adapter |
| NVRAM | No | Yes | Only switch stores the configuration in its NVRAM |
| Flash | No | Yes | No OS is required by Adapter |
| Interconnection Fabric of ports | Depends | Yes | Adapter may still use it if data transfer is done from one port to another. * |
| Parallel-to-Serial controller | Yes | Yes | Both use it when transferring data between physical media and machine. |
| Transceiver | Yes | Yes | Both use it when transferring data between physical media and NIC. |
| CPU | Yes | Yes | |
| PCI Bus connection to host computer | Yes | Yes | |
| Available interfaces | Yes 4 (max), 1 (min) | Yes 1 (max), 1 (min) | ** |
| Toggling feature | Yes | Yes | |

* The NIC may go to the external router/switch to choose a path.
** Adapter mode ent0, ent1, ent2, ent3 to the machine where NIC is connected. The manufacturer provides the MAC address for individual ports.
** Switch mode ent0 to the machine where NIC is connected, which includes an auto-generated MAC address for four external ports for outside machines. The manufacturer provided MAC address is implemented for individual ports. The external port at location one provides the address of the switch. Logging into port 1 provides access to the switch.

In exemplary embodiments, there are hardware and software considerations while toggling from the adapter mode to the switch mode. In exemplary embodiments, when toggling from the adapter mode to the switch mode: 1) the NIC clears the RAM; 2) the NIC loads the bootstrap from NVRAM; 3) the bootstrap loads OS from the flash memory; 4) the NIC loads configuration file and writes routing table and other switch related data structures in RAM; 5) the NIC enables the four external ports for servicing external devices such as those shown in FIG. 3; 6) the NIC creates a pseudo internal port and assigns a MAC address to it; 7) the NIC modifies the routing table to update the routing table for the external devices; and 8) the NIC modifies the toggle register. In exemplary embodiments, there are hardware and Software considerations while toggling from the switch mode to the adapter mode. In exemplary embodiments, when toggling from the switch mode to the adapter mode: 1) the NIC stores the current configuration in NVRAM if required; 2) the NIC clears the RAM; 3) the NIC shuts down all external ports; 4) the NIC shuts down the internal port; 5) the NIC enables the four internal ports; and 6) the NIC modifies the toggle register.

Figure 4:
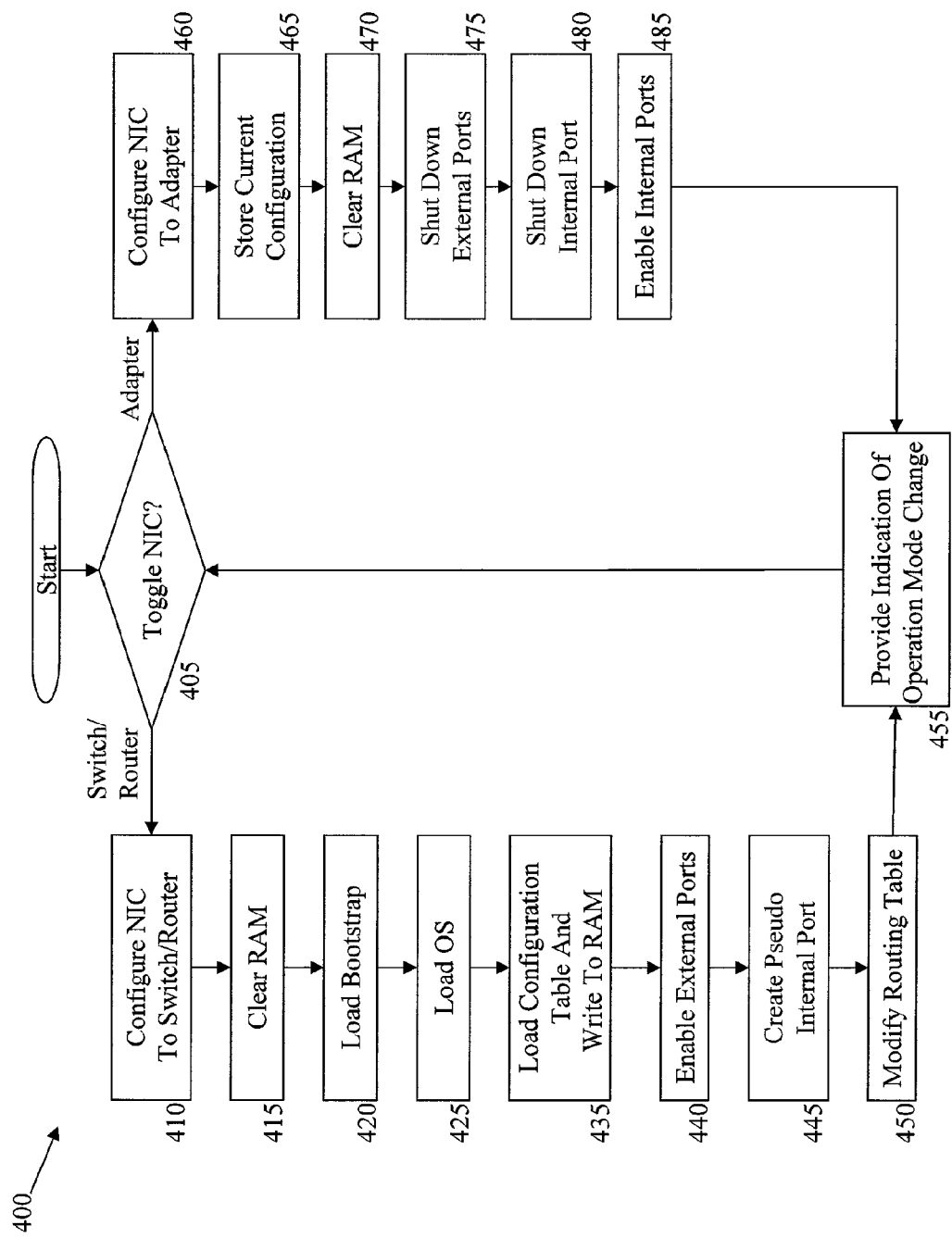
FIG. 4 illustrates a flow chart of a method for switching between an adapter mode of operation and a switch/router mode of operation in an NIC card in accordance with exemplary embodiments.

FIG. 4 illustrates a flow chart of a method for switching between an adapter mode of operation and a switch/router mode of operation in an NIC card in accordance with exemplary embodiments. At block 405, the method 400 determines if the user has toggled the NIC between the adapter and switch/router modes. If at block 405, the user has toggled to the switch/router mode, then at block 410, the NIC is configured to the switch/adapter mode at block 410 which includes clearing the RAM at block 415, loading the bootstrap from NVRAM at block 420, the bootstrap loading the OS copy from the flash memory at block 425, loading the configuration file and writing the routing table and other switch related data structures in RAM at block 435, enabling the external ports for servicing external devices at block 440, creating the pseudo internal port and assigning the MAC address to the pseudo port at block 445, modifying the routing table to update the routing table for the external devices at block 450 and providing an indication that the mode of operation has changed at block 455. In exemplary embodiments, the indication that the NIC has been toggled between an adapter mode of operation and a switch/router mode of operation includes either toggling a toggle register residing on the NIC or toggling a reserved space in the NVRAM.

Referring still to FIG. 4, if at block 405, the method 400 determines that the user has toggled to an adapter mode of operation, then at block 460, the NIC is configured to the adapter mode of operation, which includes storing the current configuration in NVRAM if required at block 465, clearing the RAM at block 470; shutting down all external ports at block 475, shutting down the internal port (e.g., the pseudo internal port configured at block 445) at block 480, enabling the internal ports at block 485 and providing an indication that the mode of operation has changed at block 455. In exemplary embodiments, the indication that the NIC has been toggled between an adapter mode of operation and a switch/router mode of operation includes either toggling a toggle register residing on the NIC or toggling a reserved space in the NVRAM. It is appreciated that the method 400 monitors the toggling at block 405.

In exemplary embodiments, the IC further includes a device driver. In exemplary embodiments, whenever the toggle register is modified, an interrupt is generated and the device driver transforms accordingly. The following illustrates an example of code logic that can be implemented in the device driver when the toggle register is modified:

```
If (Toggle==Adapter){
    Normal Processing for Adapter by transferring/receiving data between computer's
    RAM and NIC Buffer (Shared-memory).
    Available interfaces= 4 internal- en0, en1, en2 and en3.
    Available ports= 4 ports for the machine to which NIC is inserted- ent0, ent1,
    ent2 and ent3.
} else if (Toggle==Switch){
    Turn en1, en2 and en3 in DEFINED state, en0 will remain in AVAILABLE state.
    Turn ent1, ent2 and ent3 in DEFINED state, ent0 will remain in AVAILABLE
    state. But MAC address associated with ent0 will change from physical MAC
    address to auto-generated MAC address and ent0 won't be associated to physical
    port 0.
    ent0 will be associated to a virtual port created by switch internally.
    Available interfaces= 1 internal- en0. Available ports= 4 external ports (1 will be
    treated as uplink) and 1 internal for the machine to which NIC is inserted- ent0.
}
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. In a network device having a random access memory, a non-volatile random access memory and a flash memory, a method comprising:
   operating in a network switch/router mode of operation;
   operating in a network adapter mode of operation; and
   switching to the network switch/router operation in response to receiving a device configuration signal, wherein switching comprises:
   enabling external ports of the network device;
   creating a pseudo internal port for the network device and assigning a media access control address to the pseudo internal port;
   modifying a routing table residing in the network device to update the routing table for external devices;
   providing an indication in the network device that the network device has been toggled to the network switcher/router mode of operation; and
   switching to the network adapter mode of operation, comprising:
   shutting down external ports of the network device;
   shutting down an internal port of the network device;
   enabling internal ports of the network device; and providing the indication in the network device that the network device has been toggled to the adapter operation.

2. The method as claimed in claim 1, wherein providing the indication in the network device that the network device has been toggled to the network switcher/router mode of operation comprises at least one of toggling a toggle register residing on the network device and toggling a reserved space in the non-volatile random access memory having a current mode of operation of the network device.

3. The method as claimed in claim 1, wherein providing the indication in the network device that the network device has been toggled to the adapter mode of operation comprises at least one of toggling a toggle register residing on the network device and toggling a reserved space in the non-volatile random access memory having a current mode of operation of the network device.

4. The method as claimed in claim 1 further comprising switching to the network switch/router mode of operation.

5. The method as claimed in claim 1, wherein providing the indication in the network device that the network device has been toggled to the adapter mode of operation comprises at least one of toggling a toggle register residing on the network device and toggling a reserved space in the non-volatile random access memory having a current mode of operation of the network device.

6. A network apparatus, comprising:
a processor;
a non-volatile random access memory;
a plurality of ports configured to be switched between internal and external ports; and
a process residing on the processor for switching the apparatus between a network adapter mode and a network switch/router mode, wherein the process includes instructions to:
in response to being configured to an adapter mode of operation:
 shut down external ports of the network apparatus;
 shut down an internal port of the network apparatus;
 enable internal ports of the network apparatus;
in response to being configured to a switch/router mode of operation:
 enable external ports of the network apparatus;
 create a pseudo internal port for the network apparatus and assigning a media access control address to the pseudo internal port; and
 modify a routing table residing in the network device to update the routing for external devices; and
provide an indication in the network apparatus that the network apparatus has been toggled between the adapter mode of operation and the switch/router mode of operation, including at least one of toggling a toggle register residing on the network apparatus and toggling a reserved space in the non-volatile random access memory having a current mode of operation of the network apparatus.

7. A computer program product comprising:
a non-transitory computer readable storage medium having computer readable program code embodied therewith, the computer readable program code comprising:
computer readable program code configured to operate in a network switch/router mode of operation in a network device having a random access memory, a non-volatile random access memory and a flash memory;
computer readable program code configured to operate in a network adapter mode of operation in the network device; and
computer readable program code configured to switch, in the network device, to the network switch/router operation in response to receiving a device configuration signal, wherein the computer readable program code configured to switch comprises:
computer readable program code configured to enable external ports of the network device;
computer readable program code configured to create a pseudo internal port for the network device and assign a media access control address to the pseudo internal port;
computer readable program code configured to modify a routing table residing in the network device to update the routing table for external devices;
computer readable program code configured to provide an indication in the network device that the network device has been toggled to the network switcher/router mode of operation; and
computer readable program code configured to switch to the network adapter mode of operation, further comprising:
 computer readable program code configured to shut down external ports of the network device;
 computer readable program code configured to shut down an internal port of the network device;
 computer readable program code configured to enable internal ports of the network device; and
 computer readable program code configured to provide an indication in the network device that the network device has been toggled to the adapter operation.

8. The computer program product as claimed in claim 7 wherein the computer readable program code configured to provide an indication in the network device that the network device has been toggled to the network switcher/router mode of operation comprises:
computer readable program code configured to perform at least one of toggling a toggle register residing on the network device and toggling a reserved space in the non-volatile random access memory having a current mode of operation of the network device.

* * * * *